Nov. 28, 1967  G. F. KENWORTHY  3,354,991
SHOCK ABSORBER
Filed May 11, 1966
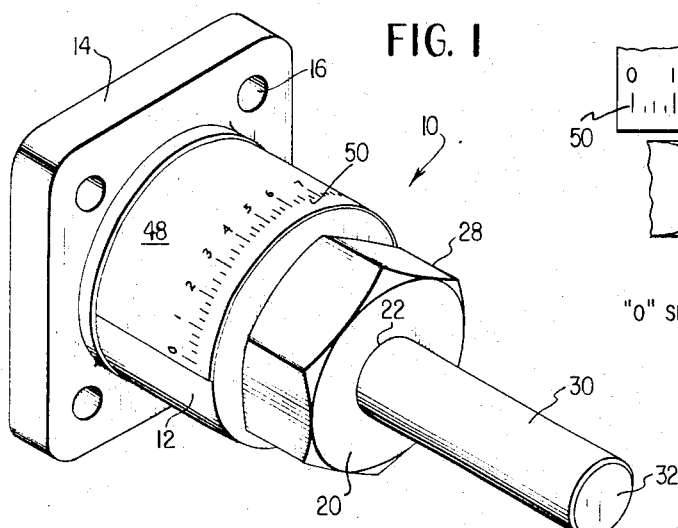
FIG. 1
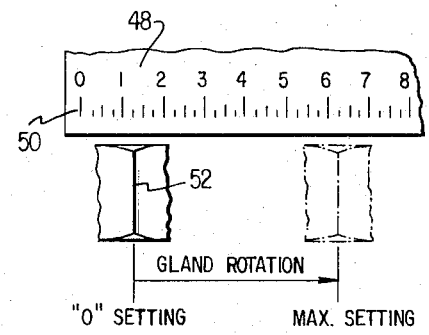
FIG. 5
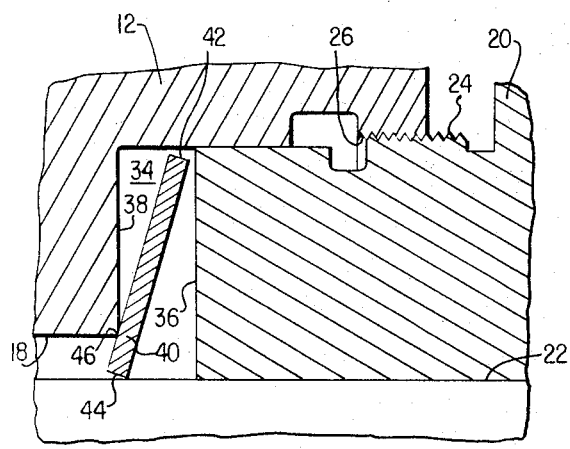
FIG. 3
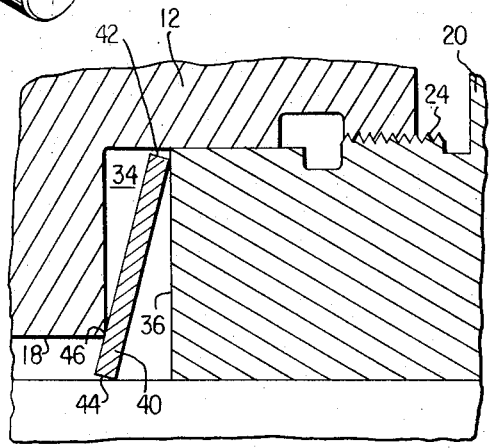
FIG. 4
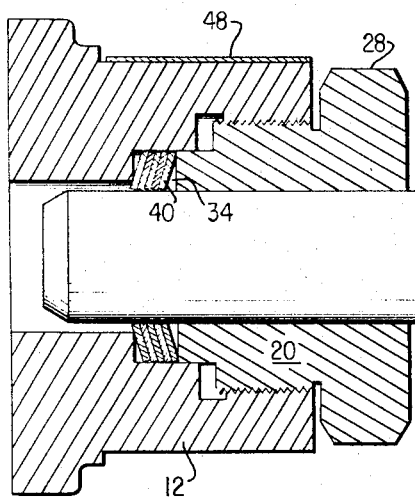
FIG. 2
INVENTOR.
GRANT F. KENWORTHY
BY
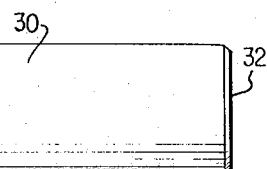
ATTORNEYS

United States Patent Office 3,354,991
Patented Nov. 28, 1967

3,354,991
SHOCK ABSORBER
Grant F. Kenworthy, Des Plaines, Ill., assignor to Rex Chainbelt Inc., Milwaukee, Wis., a corporation of Wisconsin
Filed May 11, 1966, Ser. No. 549,303
3 Claims. (Cl. 188—67)

ABSTRACT OF THE DISCLOSURE

A manually resettable shock absorber includes an adjustably mounted gland on a stationary body providing a cavity which houses dished annular friction discs, a smooth surface rod is frictionally engaged by the inner periphery of the discs. The outer periphery of one disc contacts the gland and a portion of the stationary body acts as a fulcrum for the other face of the stack of discs. Adjustment of the gland on the body controls the stopping force. Indicia on the gland and body indicates the setting and the shock absorber is manually resettable after the load is stopped to the same previous stopping force.

---

This invention relates to improvements in shock absorbers and particularly to a manually, resettable adjustable shock absorber.

Shock absorbers of various types are used for decelerating and stopping moving loads. Although the most commonly known form of shock absorber utilizes hydraulic fluid passing through internal orifices for load deceleration and utilizes springs for resetting, there is a need in the art for less expensive shock absorbers of the manually resettable type. Such shock absorbers are used in situations and positions where, under normal conditions, it is expected that they will not be used to absorb repetitive shocks. In other words, if the shock absorber is manually resettable and hence must be reset each time after it decelerates and stops a moving load, the absorber would not be used in a position where it would be expected to receive many shocks in normal operation. One place that such manually resettable shock absorbers would be used is to limit extreme movement of an overhead crane or to limit extreme movement of a machine tool component which in their usual operation would not be expected to contact the shock absorber.

In the manually resettable shock absorber art, there is need for a shock absorber having adjustability, simplicity, reliability of providing a uniform decelerating force and a simple resetting procedure while being relatively inexpensive. This invention provides such a shock absorber which fulfills these requirements while having only one moving part and one adjustable part to provide uniform deceleration with an adjustable stopping force, and the shock absorber is manually resettable after the load is stopped to the same previous force.

The foregoing and other features and advantages of the invention will be apparent from the following more particular description of a preferred embodiment of the invention, as illustrated in the accompanying drawing.

In the drawing:
FIG. 1 is a perspective view of the manually resettable shock absorber of this invention;
FIG. 2 is a longitudinal sectional view of the shock absorber shown in FIGURE 1;
FIG. 3 is a diagrammatic view of the shock absorber illustrating the condition in which the shock absorber is released and no frictional force is applied;
FIG. 4 is an enlarged sectional view similar to FIG. 3 illustrating the condition when the shock absorber is set and ready for operation; and FIG. 5 is a fractional top plan view of a portion of the shock absorber dial illustrating the manual setting and resetting features.

In the drawings, a shock absorber 10 includes a stationary body 12 which has a mounting plate 14 with suitable mounting holes 16 to be stationarily mounted in the path of a moving object to be decelerated. The body 12 includes a longitudinal bore or passage 18.

A gland 20 also having a longitudinal bore or passage 22 is adjustably mounted on the body for relative axial movement by means of threads 24 on the gland 20 and threads 26 on the body 12. The gland 20 has a hex head 28 to facilitate adjustment.

Extending through the longitudinal bore or axial passage 22 is a smooth surfaced cylindrical rod 30 having its outer end 32 positioned to be impacted or contacted by a moving load to be decelerated and stopped. As shown in FIG. 2, the rod 30 extends through the gland 20 and into the body passage 18 when set for absorbing shock.

Around the rod 30 and within the gland and body there is an adjustable size cavity 34. The cavity is defined by end 36 of gland 20 and by counterbore 38 in body 12.

Within adjustable cavity 34 is positioned at least one annular friction disc 30. FIGS. 3 and 4 show only one friction disc 40 although in the preferred embodiment of the invention as shown in FIG. 2, there are a plurality of stacked friction discs 40. Friction disc 40 includes an outer peripheral surface 42 and an inner peripheral surface 44. The disc 40 is positioned as shown in FIGS. 2, 3 and 4 so that its outer periphery 42 is closer to the load contacting end 32 of rod 30 while the inner periphery 44 is farther from the end 32 of rod 30. In this manner, when the force is applied to the end 32 of rod 30 forcing the rod to the left as viewed in FIGS. 3–5, the rod will tend to move to the left and will be slowed down by any frictional force placed thereon by the friction disc 40.

As shown in FIGS. 2 and 3, friction discs 40 bear against the corner edge 46 of bore 18 in counterbore 38 and this edge in effect functions as a fulcrum. FIG. 3 illustrates the annular friction disc 40 when no frictional force is being applied, i.e. when the gland 20 is released and the device is being reset and it is noted that the inner peripheral surface 44 clears the outer diameter of rod 30 so that rod 30 may be pulled to the right for resetting. During resetting, the gland 20 is screwed into the body 12, decreasing the length of cavity 34 and providing the condition shown in FIG. 4 wherein the outer edge of surface 36 abuts against the edge of outer periphery 42 of the washer and fulcrums the disc 40 about point 46 so that its inner periphery 44 bears upon the outer surface of rod 30 with a force determined by the degree of tightening of the gland 20, the lengths of the disc (which functions as a lever) on both sides of the fulcrum 46 and the number and character of the annular discs 40. The discs 40 are frusto-conical or dished so that their inner and outer peripheries are axially offset as indicated and, of course, the discs must be of a suitable material and section.

The operation will now be described. The gland 20 is unscrewed to the condition of FIG. 3 and the rod 30 is inserted to the position shown in FIG. 2. The gland 20 is then screwed in until it is hand-tight. At that time, an edge 52 of head 28 is aligned with one of the indicia markers 50 on dial label 48. A wrench is then placed on the hex head 28 and the gland is turned to tighten it further a predetermined number of indicia divisions corresponding to the amount of stopping force and length of stopping stroke desired. For this purpose the outer surface of body 12 may include a dial label 48 having indicia 50 thereon in order that the device may be manually reset while utilizing an edge 52 of hexagonal head 28 as the indicia pointer. When the gland is tightened, the washers 40 of FIG. 2 are contacted by end face 36 of the gland to cause them to effectively pivot about fulcrum 46 and to apply a frictional force by means of their inner periphery 44 to the surface of the smooth rod 30. In some embodiments of the invention the outer periphery 42 of discs 40 may engage the wall of counterbore 38 as shown in FIG. 5. In such embodiments the discs are radially supported and axial adjustment of gland 20 effects a sliding-pivoting of the discs on the surface of the counterbore.

When the end of rod 32 is engaged by a moving load, the rod is moved to the left as shown in FIGS. 3-5 while having a constant frictional force applied thereto by the annular friction disc 40. After decelerating and absorbing one shock load, the gland 20 is loosened and the device can be reset. Of course, the shock absorbing capacity can be tested after the first setting in order to determine if it is sufficient. The shock absorber can be reset any number of times. While the zero setting (when the gland 20 is hand-tight) changes on the indicia 50, the gland may be turned the predetermined number of indicia divisions which will accomplish the desired decelerating force. The device provides extreme reliability with the same performance after hundreds of shock absorbing strokes.

Not only is the stopping force and stopping length adjustable by means of the adjustable gland 20, but there is only one moving part during the stopping and that is the rod 30. There are no parts to replace after impact on manual resetting and the resetting is quite simple. There is also a positive stop against the outer surface of gland 20 if the load has not been completely stopped by the time the end 32 of rod 30 passes into the end of gland 20.

While the invention has been particularly shown and described with reference to preferred embodiments thereof, it will be understood by those skilled in the art that various changes in form and details may be made therein without departing from the spirit and scope of the invention.

I claim:
1. A manually resettable shock absorber for absorbing unidirectional moving load, the shock absorber comprising:
   (a) a stationary body including a bore extending therethrough,
   (b) a gland including a bore extending therethrough,
   (c) means for adjustably mounting the gland on the body for relative axial movement with the bores of the gland and body substantially aligned,
   (d) a smooth surfaced cylindrical rod extending through the bores with only one end of the rod being disposed for contact by a moving load to be decelerated,
   (e) means on the body and gland defining an adjustable cavity surrounding the rod, the cavity being adjustable by relative axial movement of the gland on the body,
   (f) at least one annular friction absorbing disc positioned in the cavity with the inner periphery of the disc adjacent to the rod and the outer periphery of the disc in the adjustable cavity and spaced from an inner peripheral wall thereof,
   (g) the annular disc being dish-shaped and the entire outer periphery of the disc being closer to the end of the rod to be contacted by the moving load than the entire inner periphery of the disc,
   (h) and, a rigid fulcrum in the stationary body formed by a corner edge of the bore and cavity, the fulcrum contacting the side of the disc near the inner periphery thereof on the side face of the disc adjacent the stationary body, an end face of the gland defining the adjustable cavity being adapted to contact the outer periphery of the disc so that upon relative axial adjustment of the gland on the body, the inner periphery of the disc may provide an adjustable friction force on the surface of the smooth cylindrical rod.

2. A shock absorber as in claim 1 wherein there are a series of identical annular friction absorbing discs abutting face to face forming in effect a single disc of stacked laminations.

3. A shock absorber as in claim 1 wherein the gland and body carry relative indicia so that the frictional force of the discs applied to the rods by the relative axial movement of the gland and body may be manually adjustable.

References Cited
UNITED STATES PATENTS
| | | | |
|---|---|---|---|
| 2,707,108 | 4/1955 | Schottler | 188—67 |
| 2,951,560 | 9/1960 | Smellie | 188—67 |

OTHER REFERENCES
IBM Tech Disclosure Bulletin, vol. 4, No. 8, January 1962, pp. 8, 74, 531.

DUANE A. REGER, *Primary Examiner.*